(No Model.)
J. ROY & E. WALDT.
HALTER WEIGHT.
No. 294,081. Patented Feb. 26, 1884.
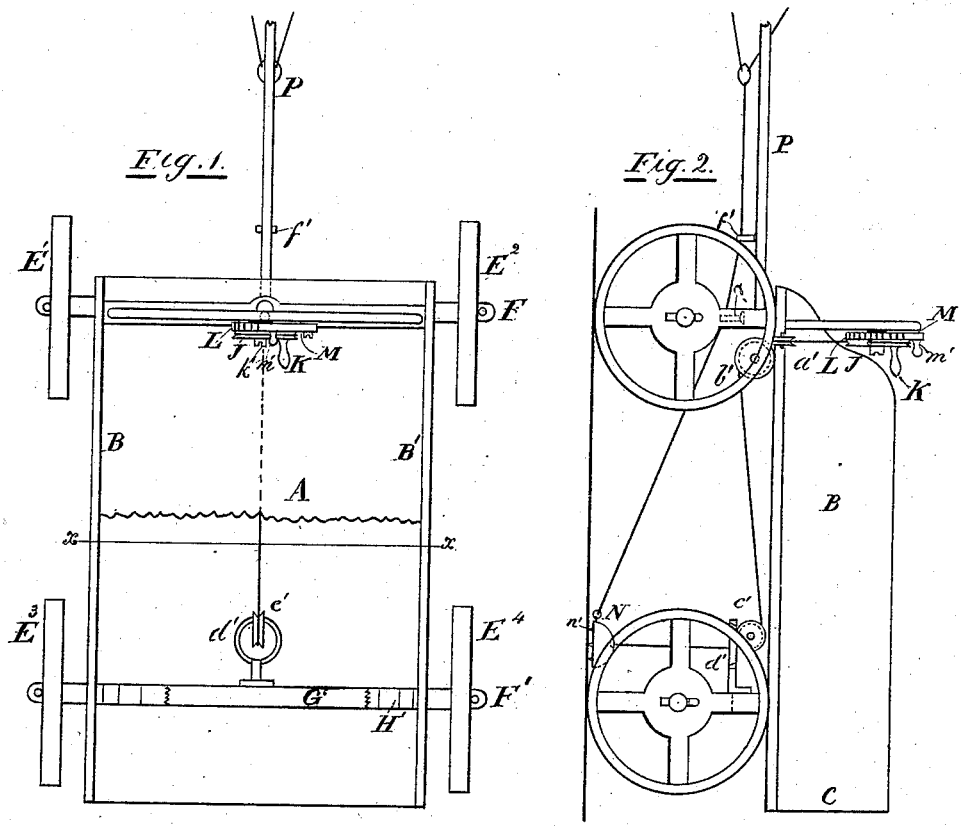
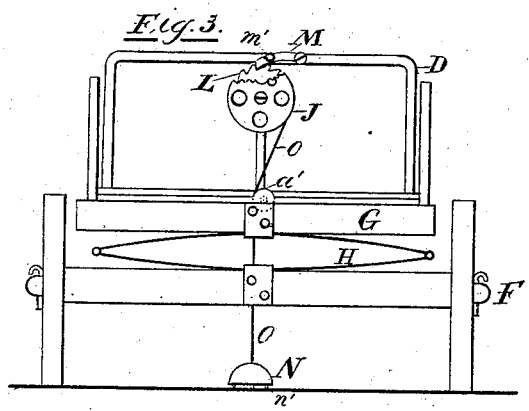
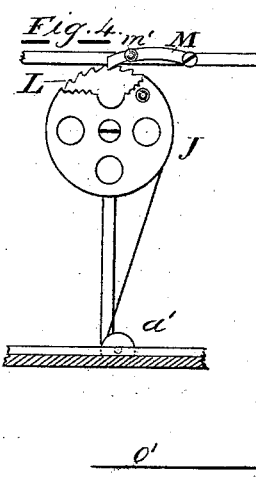
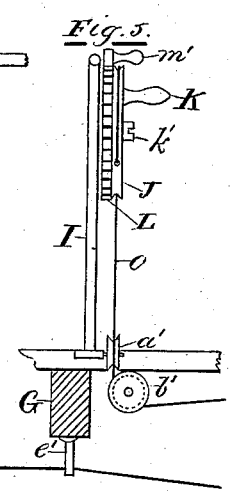
Witnesses
Wm F. Gill
David Davies
Inventors
Joseph Roy
Emile Waldt
By their Atty
William Gill

UNITED STATES PATENT OFFICE.

JOSEPH ROY, OF MONTREAL, QUEBEC, AND EMILE WALDT, OF TORONTO, ONTARIO, CANADA.

HALTER-WEIGHT.

SPECIFICATION forming part of Letters Patent No. 294,081, dated February 26, 1884.

Application filed December 17, 1883. (No model.)

*To all whom it may concern:*

Be it known that we, JOSEPH ROY, a citizen of Montreal, in the Province of Quebec, in the Dominion of Canada, and EMILE WALDT, a citizen of France, Department du Doubs, Commune Besançon, residing in Toronto, in the county of York, in the Province of Ontario, Canada, have jointly invented certain new and useful Improvements in the Attachments of Halter-Weights; and we do hereby declare that the following is a full, clear, and exact description of the invention, which will enable others skilled in the art to which it appertains to make and use the same.

Our invention relates to improvements in such halter-weights as are attached to ordinary vehicles and used by those who have frequent calls to make, such as shop-men delivering goods to their customers, or members of the medical profession visiting their patients.

The object of our invention is to furnish a device which will greatly simplify the use of the weighted halter or rein. It will be dropped on the ground and lifted therefrom without handling, and materially save time to those who use it.

We attain our object by means of certain simple mechanism, which is illustrated in the accompanying drawings, in which—

Figure 1 is a plan view of a light spring-wagon to which our device is attached. Fig. 2 is a side view. Fig. 3 is a transverse section through the line $x$ $x$ in Fig. 1. Fig. 4 is an elevation of our device, and Fig. 5 an edge view of the same. Figs. 4 and 5 are drawn to an enlarged scale.

Similar letters refer to similar parts throughout the several views.

The bottom of the wagon is marked A, the sides B B', the back end C, the metallic frame of our dash-board D, the wheels E' E² E³ E⁴, the axles F F', the cross-bars G G', the springs H H'. The standard to which our device is attached is indicated by the letter I, the main grooved pulley of the device J, with handle K and pivot $k'$, the ratchet-wheel L, and pawl M, with handle $m'$, the drag-weight N, with anchors $n'$, which are attached to the cord O, and by means of which cord a connection is made with the grooved pulley J. The pole of the wagon is marked P. A small guide-pulley, $a'$, is placed in the bottom of the vehicle and below the pulley J, which, along with two other guide-pulleys below the bottom of the vehicle $b'$ and $c'$, completes the guidance of the cord from the pulley J to the drag-weight N. A flat ring, $d'$, attached to the cross-bar G', is so placed as to stop the further ascent of the weight N when being wound up. The line or cord leading from the drag-weight to the front of the vehicle is marked O', the same being attached to the side and near to the base of the weight N, and passes first over a guide-ring fastened upon the front cross-bar, G, and marked $e'$. Another guide-ring, $f'$, is placed forward and under the pole P. When the cord or rein has passed through the latter ring $f'$, it is divided into two lines, providing thereby a rein for each of the two horses, the device being adapted for either one or two horses, as desired.

In operating our device, in order to drop the weight N on the ground it is only necessary to release the pawl M from the ratchet L by lifting the handle $m'$. The weight will then drop, and with sufficient force from its gravity, together with the pointed anchors $n'$ therein, to hold the horses. When the driver, after making a call, returns to his vehicle, having nothing to lift into it, he quietly takes his seat and lets down the pawl M on the ratchet L, and giving to the pulley J one turn (less or more) to wind up the weight N to the stop $d'$, he continues his journey, making calls where required.

Having thus described our invention, we claim—

1. A halter drag-weight for one or more horses, constructed with anchors in the bottom thereof, in combination with a grooved pulley, J, with handle K and pivot $k'$, a ratchet, L, with pawl M and handle $m'$, a flexible cord or strap, O, with guide-pulleys $a'$ $b'$ $c'$, and stopping-ring $d'$, all as shown and described, and operating as set forth.

2. In combination with the drag-weight N, a cord or strap, O', connecting the horses with the drag-weight, and the guide-rings $e'$ $f'$, as specified and described, and for the purpose set forth.

JOSEPH ROY.
EMILE WALDT.

Witnesses:
WILLIAM GILL,
L. BREDANNAZ.